United States Patent
Mozer et al.

(10) Patent No.: US 8,062,451 B2
(45) Date of Patent: Nov. 22, 2011

(54) POST MOLDING APPLICATION OF AN EXTRUDED FILM TO AN INJECTION MOLDED PART

(75) Inventors: Wilfried Mozer, Warren, MI (US); Brian L. DeSmith, Oxford, MI (US)

(73) Assignee: Delta Engineered Plastics, Auburn Hills, MI (US)

( * ) Notice: Subject to any disclaimer, the term of this patent is extended or adjusted under 35 U.S.C. 154(b) by 293 days.

(21) Appl. No.: 12/390,989

(22) Filed: Feb. 23, 2009

(65) Prior Publication Data

US 2010/0212813 A1    Aug. 26, 2010

Related U.S. Application Data

(60) Provisional application No. 61/030,701, filed on Feb. 22, 2008.

(51) Int. Cl.
B29C 65/00    (2006.01)
B32B 37/00    (2006.01)

(52) U.S. Cl. ............... 156/160; 156/244.11; 156/244.21; 156/244.27; 156/245; 156/246; 156/185; 156/381; 156/382

(58) Field of Classification Search .................. 156/160, 156/381–382, 244.11, 244.21, 244.27, 245, 156/246, 285
See application file for complete search history.

(56) References Cited

U.S. PATENT DOCUMENTS

| 5,096,652 | A | * | 3/1992 | Uchiyama et al. ............ 264/511 |
| 5,135,797 | A |   | 8/1992 | Sasaki |
| 5,188,882 | A |   | 2/1993 | Uchiyama et al. |
| 5,466,320 | A |   | 11/1995 | Burt et al. |
| 6,071,621 | A |   | 6/2000 | Falaas et al. |
| 6,349,754 | B1 | * | 2/2002 | Johnson et al. ................ 156/221 |
| 6,454,557 | B1 |   | 9/2002 | Chun et al. |
| 6,565,955 | B2 |   | 5/2003 | Fields et al. |

(Continued)

FOREIGN PATENT DOCUMENTS

JP    58-28347    2/1983

OTHER PUBLICATIONS

Carl Kirkland, Injection Molding, Molded-in paint jobs save cash, Manufacturing Shoot/Shape/Ship, http://injectionmoldingmagazine-digital.com/immnet/200711//Print_submit.action?a...,Nov. 2007.

(Continued)

*Primary Examiner* — Khanh P Nguyen
*Assistant Examiner* — Carson Gross
(74) *Attorney, Agent, or Firm* — Brooks Kushman P.C.

(57) ABSTRACT

A method of laminating a decorative layer to a molded part comprises molding a part formed of an amorphous or semi-crystalline thermoplastic resin and applying a segment of co-extruded an amorphous or semi-crystalline thermoplastic resin film to the part. The part is loaded into a vacuum forming nest and maintained in a heated state. The film is heated and then positioned over the part in a pressure box. A vacuum is applied through the vacuum forming nest to a first side of the film facing the part at the same time air pressure is applied through the pressure box to a second side of the film. The film is bonded directly to the part without the need for an adhesive.

14 Claims, 2 Drawing Sheets

U.S. PATENT DOCUMENTS

| | | | |
|---|---|---|---|
| 6,648,043 B1 | 11/2003 | Kundinger et al. | |
| 6,858,287 B2 | 2/2005 | Fields | |
| 6,929,711 B2 * | 8/2005 | Benninger | 156/212 |
| 7,195,727 B2 * | 3/2007 | Sienkiewicz et al. | 264/132 |
| 2002/0009594 A1 | 1/2002 | Smith et al. | |
| 2007/0084542 A1 | 4/2007 | Montagna et al. | |
| 2009/0167037 A1 * | 7/2009 | Czopek et al. | 293/120 |

OTHER PUBLICATIONS

Hendrickson Aero Bright—Brilliant "Chrome-Like" Non-Metal Products for the Heavy Trucking Industry, C119 Rev A Jul. 5, 2005 Hendrickson USA, L.L.C.

R-Series, Vacuum Rotary Thermoformer, Brown Machine LLC.

* cited by examiner

POST MOLDING APPLICATION OF AN EXTRUDED FILM TO AN INJECTION MOLDED PART

CROSS-REFERENCE TO RELATED APPLICATIONS

This application claims the benefit of U.S. provisional application Ser. No. 61/030,701 filed Feb. 22, 2008.

BACKGROUND OF THE INVENTION

1. Field of the Invention

The present invention relates to the field of decorating molded parts by applying a decorative film to the part.

2. Background Art

Molded parts may be provided as bare undecorated parts or may be decorated by painting. Recently, molded parts such as bumpers, grill surrounds, light bezels, sun visors and other vehicle components have been developed that are decorated with a film product that includes a fluoropolymer clear coat, an indium bright layer, a tie coat and primer and a heat-activated adhesive layer. The indium bright layer may have a chrome-like appearance that is UV resistant, weather resistant and resistant to corrosive materials and stone chips.

One of the problems that faces implementation of film decoration of products includes the cost of the process of applying an adhesive to the film and the cost of the adhesive. The cost of decorative lamination films may add substantial cost to the finished product. In addition, surface imperfections and contaminants, such as dust, may be visible or even magnified by the film when the decorated part is observed or inspected.

The above problems are addressed by applicants' invention as summarized below.

SUMMARY OF THE INVENTION

According to one aspect of the present invention, a method of laminating a decorative layer to a molded part is provided that comprises molding a part formed of an amorphous or semi-crystalline thermoplastic resin and applying to the part a segment of co-extruded film that includes an amorphous or semi-crystalline thermoplastic backer, a decorative layer and a clear coat layer. The part may be loaded into a vacuum forming machine in a heated state or may be subsequently heated. The film is heated and positioned over the part and under a pressure box. Vacuum is provided by the vacuum forming machine to a first side of the film facing the part at the same time air pressure is applied through the pressure box to a second side of the film. The film is bonded directly to the part without the need for an adhesive.

According to another aspect of the invention, a method of preparing a part for lamination of a decorative film on the part is provided. The part is formed by injecting an amorphous or semi-crystalline thermoplastic resin into an injection molding die. The resin is injected into a mold at a temperature of at least the melt temperature of the amorphous or semi-crystalline thermoplastic resin. The mold is maintained at a temperature of between 35° C. and 75° C. and the molded part is cooled to below 85° C. before removing the part from the mold. The part is further cooled after being removed from the mold. The part is reheated, if necessary, to between 55° C. and 85° C. before laminating the decorative film on the part.

According to a different aspect of the invention, a method is provided for preparing a film that is to be laminated to a part. The method comprises co-extruding the film which includes a backer layer of an amorphous or semi-crystalline thermoplastic resin, a decorative layer, and an acrylic clear coat layer. The film is cut into segments and clamped into a frame. The film is heated to soften the layer of an amorphous or semi-crystalline thermoplastic resin to a paste-like consistency while being supported by one or both of the decorative layer and the clear coat layer.

The above methods are directed to providing a more cost-effective process for decorating molded parts. The molding process utilizes a less expensive extruded decorative film that can be applied to a molded part. The film envelops and conceals undesirable surface imperfections and distortions. Unexpectedly, the above advantages may be obtained while at the same time eliminating the need for an adhesive to bond the film to the molded part.

These and other problems and disadvantages are addressed by the method described below.

DETAILED DESCRIPTION OF THE ILLUSTRATED EMBODIMENT

Figure 1:
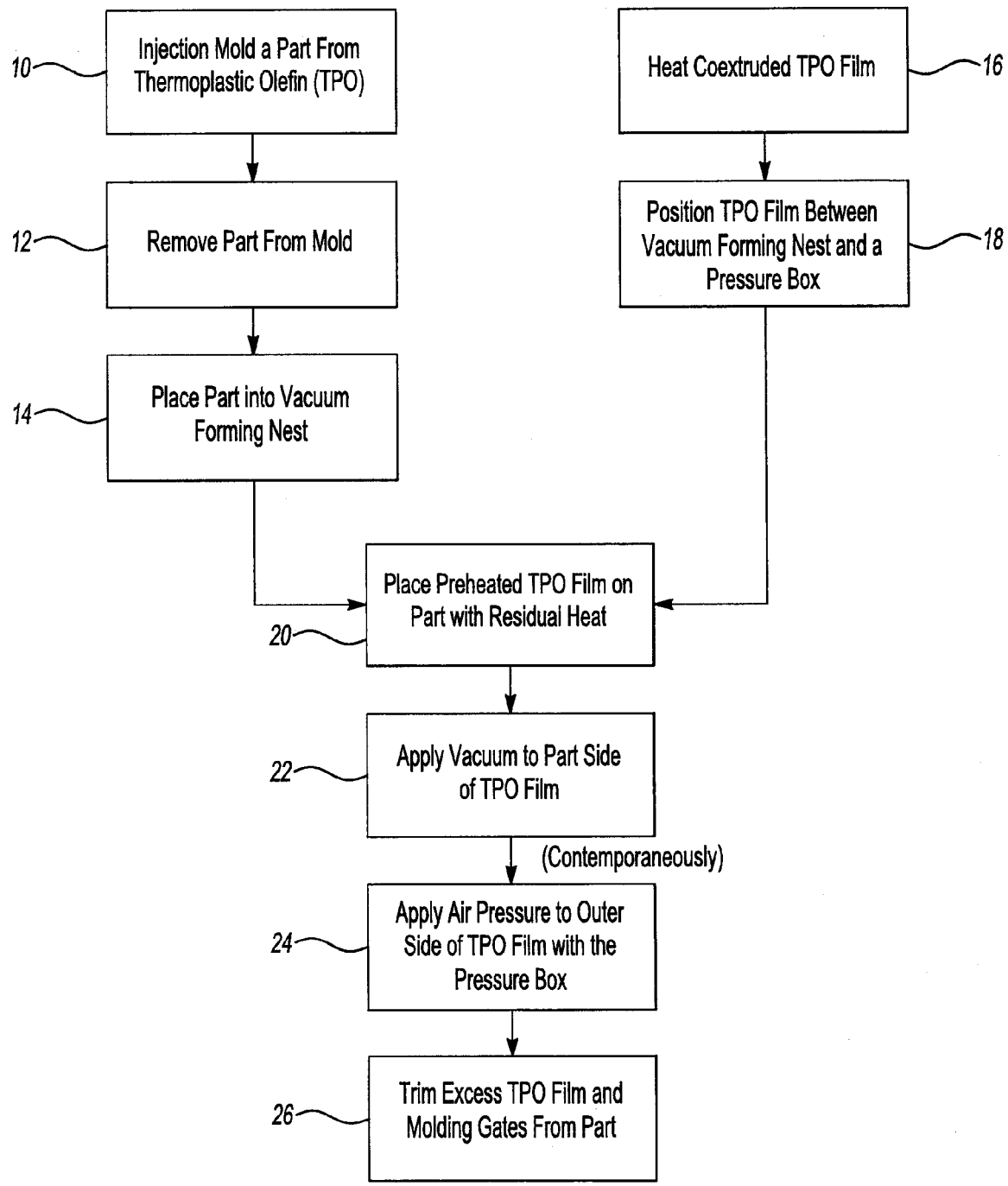
FIG. 1 is a process flowchart illustrating the steps of the method of applying a film to an injection-molded part according to one embodiment of the present invention.

The following description makes reference to the attached flowchart of the process as depicted in FIG. 1. The process is described beginning with injection molding a part from an amorphous or semi-crystalline thermoplastic resin. Examples of such resins include acrylonitrile butadiene styrene (ABS), polycarbonate/ABS, and thermoplastic olefin resin (hereinafter "TPO"). TPO is the resin referred to herein as an example throughout this application, but the invention should not be construed as being limited to TPO. Specific references to TPO should generally be understood to include amorphous or semi-crystalline thermoplastic notwithstanding differences in melting temperatures and other characteristics.

The part is preferably injection molded, at 10, from either solid TPO or from mechanically or chemically foamed TPO, that is injection molded with or without gas counter pressure. The TPO is injected into the mold at its melt temperature, which is about 220° C. The molded part may be provided with a smooth or textured outer surface and a foamed or solid polymer interior that cools and cures to form a part.

After the part is formed, the part is removed from the mold, at 12. The part is permitted to cool before it is removed from the injection mold that operates at a temperature between 35° C. and 75° C. Before the part is removed from the mold, the molten TPO is permitted to cool in the mold to a temperature below 85° C., the heat deflection temperature of the TPO molding resin. Of course, other resins will be cooled to a greater or lesser extent depending upon their heat deflection temperature. The cooled part is moved to a holding area where the foaming gas, in the case of the foamed TPO, is allowed to vent for a period of time, or "degassed," before the part is decorated in the manufacturing process. Degassing is important to assure adhesion and is particularly important with structural foam parts.

The part is placed or loaded onto the vacuum-forming nest of a multi-station rotary thermoforming machine, a thermoforming shuttle, or similar piece of equipment, at 14. The multi-station thermoforming machine includes an indexing vacuum-forming nest which may carry the molded part through a pre-heat oven. For example, a TPO resin molded part may be reheated to approximately 55° C. The preheating temperature for other resins will vary depending upon the type of resin. The thermoforming machine also includes an oven for heating the decorative film that comprises an amorphous or semi-crystalline thermoplastic resin, pigmented layer and a clear coat acrylic layer. The thermoforming machine also includes a combination vacuum/pressure source. The vacuum/pressure source is connected to vacuum ports on the supporting surface of the nest and to a pressure box, which is positioned over the injection molded part and the pre-heated decorative sheet. During this time, the vacuum-forming nest maintains the molded part at an elevated temperature of approximately 55° C.

In a parallel manufacturing operation, a segment of decorative film is clamped onto a frame and is heated in the oven segment of the thermoforming machine to a temperature of from 195° C. to about 280° C., depending on the specification of the particular film sheet that is to be applied to the molded part.

The co-extruded TPO film sheet is formed in part from a backing layer of extrusion grade TPO, a pigmented layer (for example, paint film or chrome-look layer) and may also include a clear coat acrylic top layer. Extrusion grade TPO is characterized as having a density of 0.980 g/cc; linear mold shrinkage of 0.0100 cm/cm; and a melt flow rate of 0.800 g/10 minutes. The paint film or chrome-look layer is preferably a polyester or acrylic resin that includes a pigment or could alternatively be indium coated thermoplastic film such as mylar. The heat deflection temperature and elongation temperature of the thermoplastic resin of the pigmented layer is greater than the resin of the backer layer.

In addition to the pigmented layer, the film may include a top layer comprising, for example, a fluoropolymer or an acrylic clear coat layer. The top layer is characterized as having a heat deflection temperature and elongation temperature that is greater than that of the backer layer.

A masking film may be provided on the clear coat layer to protect the clear coat layer during shipping and handling until it is ready to be heated.

The backer layer of the extrusion grade TPO when heated within the above range has a "paste-like" consistency. When heated to this range, the backer layer is cohesive in that it does not run, but is easily conformed to the part. The paint film or chrome-look layer and the acrylic clear coat layer preferably have a higher heat deflection temperature and elongation temperature that reduces the tendency of these layers to conform to surface imperfections and contaminants on the surface of the part to which the decorative film is applied.

The masking film is removed prior to loading the sheet into the clamping frame of a pressure box and heating the co-extruded TPO film in the oven, at 16. The pressure box has an open base and sides that engage the vacuum-forming nest and form a seal when placed against the nest. The clamping frame is positioned at the open end of the pressure box.

After heating, the TPO film in the clamping frame is positioned between the pressure box and the molded part on the vacuum-forming nest, at 18. The preheated TPO film is then applied to the part on the vacuum-forming nest. The pressure box is then lowered onto and seals against the runoff surface on the vacuum-forming nest, at 20.

The molded part may be heated by a pre-heat oven of the vacuum forming machine and by thermolater water lines in the vacuum-forming nest. The preheat and thermolater water lines are used together to bring the part temperature to 55° C. for TPO, for other appropriate thermoplastic resins the temperature is expected to be between 55° C. and 75° C. When heated, the pores in the molecular matrix structure of the part open to allow cross-linking and impingement that facilitate cohesion of the film to the part. In addition, the molded part may receive a flash of heat from an infrared heat source just prior to the application of the sheet to the molded part to elevate the temperature of the surface of the part to which the sheet is to be bonded.

The TPO film is drawn to the part by applying a vacuum to the part side of the TPO film, at 22. Air pressure is introduced into the pressure box contemporaneously with the step of applying vacuum to the inner, or part, side of the TPO film. Air pressure is applied to the outer, or finished, side of the TPO film, at 24. The vacuum draws the TPO film around the part and into any openings in the part while the air pressure in the box is applied to the outer side of the TPO film to exert pressure on the exterior portions of the TPO sheet. The TPO sheet bonds to the TPO part as a result of the combined effect of the TPO part and the TPO sheet being in a heated condition while the vacuum and air pressure force the sheet into firm contact with the part.

After the TPO film is applied and bonded to the part at 24, the part may be removed from the vacuum-forming nest. Excess TPO film and molding gates are trimmed from the part, at 26, to provide a fully decorated and trimmed molded part.

At the proposed operating temperatures, the backer layer not only serves to act as a bonding agent but also acts as a leveling float in which minor surface contaminants and part imperfections are enveloped and hidden by the "paste-like" layer of the heated sheet. By reducing the thickness of the backer layer, it is possible to produce a simulated "orange peel" look when the sheet is applied over an appropriately textured injection molded TPO part. Thicker backer layers provide a more level surface and are generally provided with chrome-look parts or parts that are painted to match smoother paint areas such as hoods, roofs, or deck lids.

The process results in a material cost reduction and a reduction in the number of steps to form and decorate the part and yields a decorated part that is virtually free of surface contaminants that are frequently visible on surfaces that are decorated by conventional means. The process also provides a greater variety of decorating options for molded parts. Cost savings may be obtained as a result of elimination of adhesive from between the TPO sheet and the TPO part. Sizable production savings can also be achieved from greatly reduced scrap factors without the need for a clean-room environment.

Figure 2:
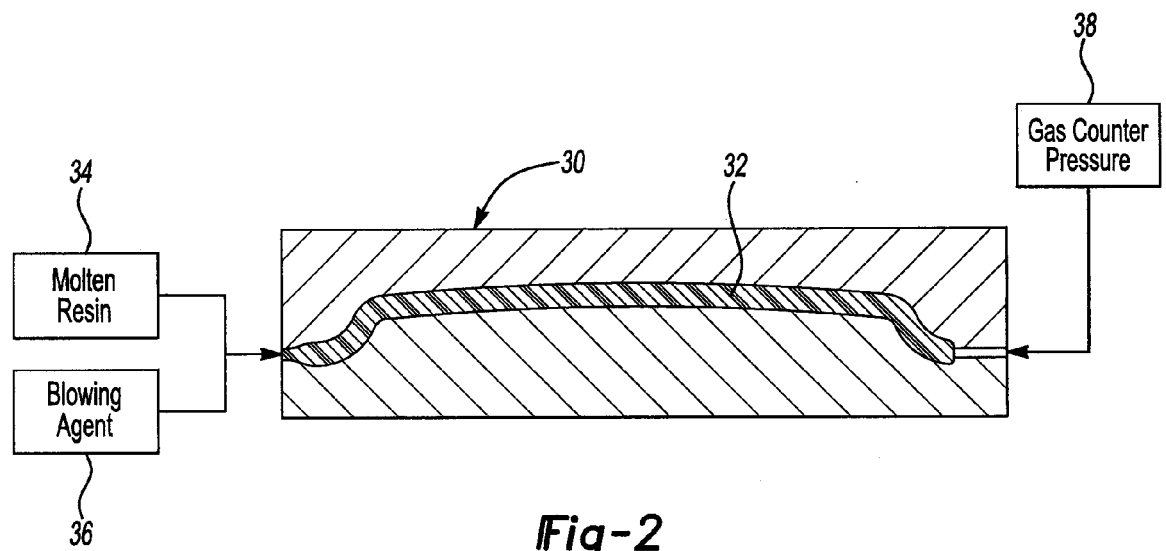
FIG. 2 is a diagrammatic cross-sectional view of an injection molding machine.

Referring to FIG. 2, an injection molding die 30 is illustrated diagrammatically. The injection molding die 30 is used to form a part 32 from molten plastic 34 that may or may not be foamed by the addition of a blowing agent 36. In one type of injection molding operation gas counter pressure 38 may be provided to improve part quality.

Figure 3:
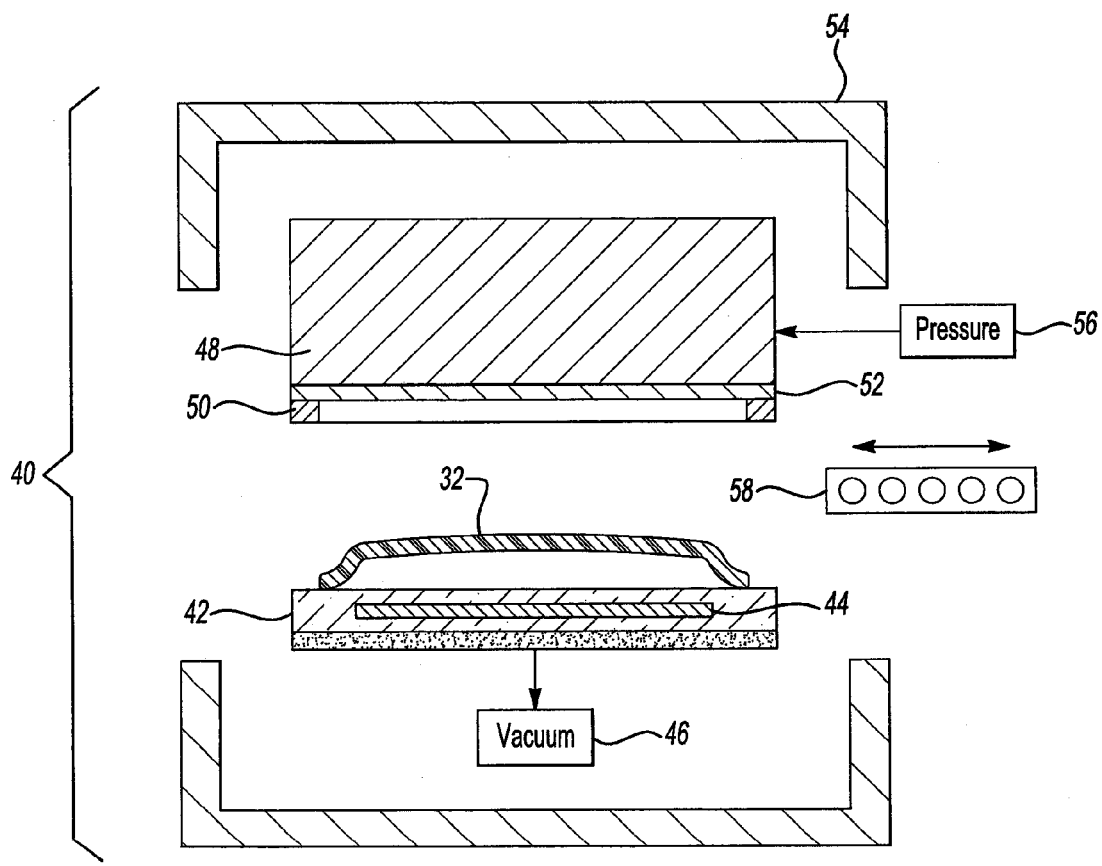
FIG. 3 is a diagrammatic cross-sectional view of a thermoforming machine.

Referring to FIG. 3, a thermoforming machine 40 is illustrated diagrammatically. The thermoforming machine 40 includes a vacuum nest 42 that may be heated by thermolater water heating lines 44. A source of vacuum 46 provides vacuum to the vacuum nest 42. A pressure box 48 and a frame 50 retain a segment of decorative film 52 as the film is heated in an oven 54 that may be part of the thermoforming machine 40. A source of air pressure 56 is ported to the pressure box that may be used to apply pressure to the film that complements the vacuum 46 that draws the film into contact with the part 32 to be decorated by the decorative film 52. The thermoforming machine may also include an infrared heater 58 that may be used to heat a surface of the part prior to applying the decorative film 52 to the part 32.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of laminating a decorative layer to a molded part for use in forming a decorated part, the method comprising:
    molding a part formed of an amorphous or semi-crystalline thermoplastic resin;
    loading the part into a vacuum forming nest;
    positioning a thermoplastic film over the part on the vacuum forming nest, the film including a first thermoplastic layer and a second thermoplastic layer, the first thermoplastic layer having a first heat deflection temperature, the second thermoplastic layer having a second heat deflection temperature, the second heat deflection temperature is less than the first heat deflection temperature;
    heating the part to a first temperature effective to bond cohesively between the part and the second layer, the first temperature being less than the second heat deflection temperature;
    heating a segment of the film to a second temperature effective for bonding the second layer cohesively to the part, the second temperature being more than the second heat deflection temperature and less than the first heat deflection temperature of the first layer;
    placing the film on the part;
    applying a vacuum through the vacuum forming nest to a first side of the film facing the part;
    cohesively bonding the film directly to the part; and
    trimming a portion of the film from about the periphery of the part.

2. The method of claim 1 further comprising heating a part bonding surface to be decorated of the part before positioning the film over the part.

3. The method of claim 2 wherein the step of heating the part bonding surface of the part is performed in an oven before the step of loading the part into the vacuum forming nest.

4. The method of claim 2 wherein the step of heating the part includes the step of providing a flash of infrared heat to the part bonding surface after the step of loading the part into the vacuum forming nest and prior to the step of cohesively bonding the film directly to the part.

5. The method of claim 1 wherein the amorphous or semi-crystalline thermoplastic resin of the part and the film are the same resin.

6. The method of claim 5 wherein the resin of the film is extrusion grade thermoplastic polyolefin.

7. The method of claim 1 wherein the vacuum forming nest is part of a thermoforming machine, and wherein the part is moved through an oven by the thermoforming machine and reheated to approximately 55° C.

8. The method of claim 1 further comprising clamping the film in a frame of a thermoforming machine and heating the film to between 195° C. and 280° C.

9. The method of claim 1 wherein the second layer of the film further comprises an amorphous or semi-crystalline thermoplastic resin that is heated until it has a paste-like consistency.

10. The method of claim 9 wherein the first layer of the amorphous or semi-crystalline thermoplastic resin film further comprises a decorative layer.

11. The method of claim 9 wherein the thickness of the an amorphous or semi-crystalline thermoplastic resin film is limited to provide a simulated orange-peel look after being applied to a textured surface of the part.

12. The method of claim 9 wherein the second layer of the amorphous or semi-crystalline thermoplastic resin film envelopes surface imperfections and contaminants and functions to level an outer surface of the film to hide the surface imperfections and contaminants.

13. A method of laminating a decorative layer to a molded part formed of an amorphous or semi-crystalline thermoplastic resin for use in forming a decorated part, the method comprising:
    selecting a thermoplastic film including a first thermoplastic layer and a second thermoplastic layer, the first thermoplastic layer having a first heat deflection temperature, the second thermoplastic layer having a second heat deflection temperature that is less than the first heat deflection temperature;
    heating the part to a first temperature effective to bond cohesively between the part and the second layer, the first temperature being less than the second heat deflection temperature;
    heating a segment of the film to a second temperature effective for bonding the second layer cohesively to the part, the second temperature being higher than the second heat deflection temperature and lower than the first heat deflection temperature;
    placing the film on the part;
    applying a differential pressure to a first side of the film facing the part; and
    cohesively bonding the film directly to the part.

14. A method of laminating a decorative layer to a molded part formed of an amorphous or semi-crystalline thermoplastic resin for use in forming a decorated part, wherein the part has a molded texture having a depth, the method comprising:
    selecting a thermoplastic film including a first thermoplastic layer and a second thermoplastic layer, the first thermoplastic layer having a first heat deflection temperature, the second thermoplastic layer having a second heat deflection temperature that is less than the first heat deflection temperature;
    heating the part to a first temperature effective to bond cohesively between the part and the second layer, the first temperature being less than the second heat deflection temperature;
    heating a segment of the film to a second temperature effective for bonding the second layer cohesively to the part, the second temperature being higher than the second heat deflection temperature and lower than the first heat deflection temperature;
    placing the film on the part;
    applying a differential pressure to a first side of the film facing the part; and
    cohesively bonding the film directly to the part, wherein the thickness of the second layer is selected to level minor surface contaminants to and partially reduce the depth of the texture in the part with the film bonded to the part.

* * * * *